United States Patent
Sato (10) Patent No.: US 10,632,902 B2
(45) Date of Patent: Apr. 28, 2020

(54) DRIVING EVALUATION SYSTEM AND STORAGE MEDIUM

(71) Applicant: HONDA MOTOR CO., LTD., Minato-ku, Tokyo (JP)

(72) Inventor: Masayuki Sato, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/246,599

(22) Filed: Jan. 14, 2019

(65) Prior Publication Data

US 2019/0232862 A1 Aug. 1, 2019

(30) Foreign Application Priority Data

Jan. 29, 2018 (JP) ................................. 2018-012536

(51) Int. Cl.
*B60Q 1/34* (2006.01)
*G08G 1/16* (2006.01)

(52) U.S. Cl.
CPC ............. *B60Q 1/346* (2013.01); *G08G 1/166* (2013.01); *G08G 1/167* (2013.01)

(58) Field of Classification Search
CPC ......... B60Q 1/346; G08G 1/166; G08G 1/167
USPC ....................................................... 340/465
See application file for complete search history.

(56) References Cited

U.S. PATENT DOCUMENTS

| 7,510,038 | B2* | 3/2009 | Kaufmann | ............ | B62D 1/286 |
| | | | | | 180/167 |
| 7,719,431 | B2* | 5/2010 | Bolourchi | ............ | B60K 28/066 |
| | | | | | 340/439 |
| 8,876,535 | B2* | 11/2014 | Fields | .................... | G09B 19/14 |
| | | | | | 434/64 |
| 9,784,592 | B2* | 10/2017 | Gupta | ................. | B60W 30/00 |
| 10,343,694 | B2* | 7/2019 | Minegishi | | |
| 2010/0209882 | A1* | 8/2010 | Lin | ...................... | G09B 19/167 |
| | | | | | 434/65 |

FOREIGN PATENT DOCUMENTS

| JP | 2010-218504 | 9/2010 |
| JP | 2011-150573 | 8/2011 |
| JP | 2014-238676 | 12/2014 |
| JP | 2017-033270 | 2/2017 |

OTHER PUBLICATIONS

Japanese Office Action for Japanese Patent Application No. 2018-012536 dated Aug. 20, 2019.

* cited by examiner

*Primary Examiner* — John A Tweel, Jr.
(74) *Attorney, Agent, or Firm* — Amin, Turocy & Watson, LLP (57) ABSTRACT

A driving evaluation system includes an acquirer configured to acquire an operation state of a direction indicator and a relative position of a vehicle with respect to a traveling lane along which the vehicle travels, and an evaluator configured to refer to the relative position acquired and thereby evaluate a driver's skill in driving as higher as the vehicle travels at a position closer to the center of the traveling lane, the evaluator reducing an influence of the relative position of the vehicle on an evaluation during a first period from when the direction indicator is operated to be in an on state on the basis of the operation state of the direction indicator, and gradually reducing the influence during a second period shorter than the first period from when the direction indicator is operated to be in an on state.

7 Claims, 11 Drawing Sheets

DRIVING EVALUATION SYSTEM AND STORAGE MEDIUM

CROSS-REFERENCE TO RELATED APPLICATION

Priority is claimed on Japanese Patent Application No. 2018-012536, filed Jan. 29, 2018, the content of which is incorporated herein by reference.

BACKGROUND

Field of the Invention

The present invention relates to a driving evaluation system and a storage medium.

Description of Related Art

There has been disclosed a driving evaluation device that evaluates the appropriateness of a driving operation for a lane change on the basis of a distance from the right and left ends of a vehicle to each division line recorded together with a time and information indicating the presence or absence of an operation of a direction indicator (Japanese Unexamined Patent Application, First Publication No. 2017-33270).

However, in the related art, a driver's confidence in an evaluation result may be low.

The present invention was contrived in view of such circumstances, and one object thereof is to provide a driving evaluation system and a storage medium which make it possible to improve a driver's confidence in an evaluation result.

SUMMARY

An evaluation system and a storage medium according to this invention adopt the following configurations.

(1) According to an aspect of this invention, there is provided a driving evaluation system including: an acquirer configured to acquire an operation state of a direction indicator and a relative position of a vehicle with respect to a traveling lane along which the vehicle travels; and an evaluator configured to refer to the relative position acquired by the acquirer and thereby evaluate a driver's skill in driving as higher as the vehicle travels at a position closer to the center of the traveling lane, the evaluator reducing an influence of the relative position of the vehicle acquired by the acquirer on an evaluation during a first period from when the direction indicator is operated to be in an on state on the basis of the operation state of the direction indicator acquired by the acquirer, and gradually reducing the influence during a second period shorter than the first period from when the direction indicator is operated to be in an on state on the basis of the operation state of the direction indicator acquired by the acquirer.

(2) In the evaluation system of the aspect of (1), the first period includes a period until an elapse of a third period shorter than the first period from when the direction indicator is operated to be in an off state.

(3) In the evaluation system of the aspect of (1), the evaluator is configured to gradually increase the influence until a third period elapses from when the direction indicator is operated to be in an off state.

(4) In the evaluation system of the aspect of (3), the second period is shorter than the third period.

(5) In the evaluation system of the aspect of (1), in a process of reducing an influence of a relative position of a vehicle acquired by the acquirer on an evaluation during the second period, the evaluator is configured to change the influence of the relative position of the vehicle acquired by the acquirer on an evaluation stepwise from a high state to a low state, or gradually change the influence from a high state to a low state.

(6) In the evaluation system of the aspect of (3), in a process of reducing an influence of the relative position of the vehicle acquired by the acquirer on an evaluation during a third period, the evaluator is configured to change the influence of the relative position of the vehicle acquired by the acquirer on an evaluation stepwise from a low state to a high state, or gradually change the influence from a low state to a high state.

(7) According to another aspect of this invention, there is provided a non-transitory computer-readable storage medium configured to cause a computer to: acquire an operation state of a direction indicator and a relative position of a vehicle with respect to a traveling lane along which the vehicle travels; refer to the acquired relative position and thereby evaluate a driver's skill in driving as higher as the vehicle travels at a position closer to the center of the traveling lane; reduce an influence of the acquired relative position of the vehicle on an evaluation during a first period from when the direction indicator is operated to be in an on state on the basis of the acquired operation state of the direction indicator, and gradually reduce the influence during a second period shorter than the first period from when the direction indicator is operated to be in an on state.

According to the above (1) to (7), it is possible to improve a driver's confidence in an evaluation result.

DETAILED DESCRIPTION OF EMBODIMENTS

Hereinafter, an embodiment of a driving evaluation system and a storage medium of the present invention will be described with reference to the accompanying drawings.

Figure 1:
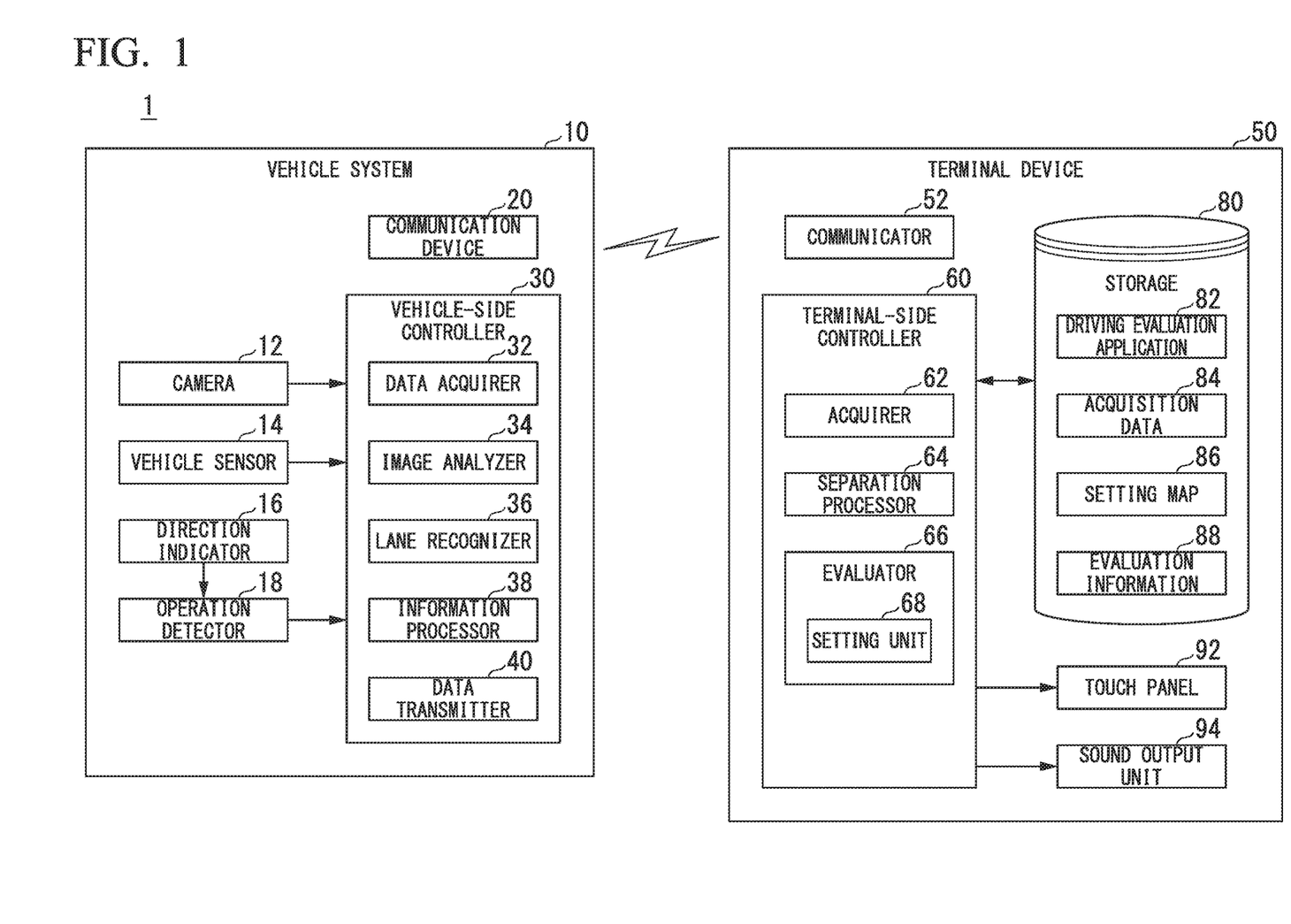
FIG. 1 is a diagram showing an example of a functional configuration of a driving evaluation system.

FIG. 1 is a diagram showing an example a functional configuration of a driving evaluation system 1. The driving evaluation system 1 includes a vehicle system 10 and a terminal device 50. The vehicle system 10 and the terminal device 50 communicate with each other using a short-range radio communication standard such as Bluetooth (registered trademark). The vehicle system 10 and the terminal device 50 can communicate with each other by performing, for example, mutual authentication (so-called pairing).

Vehicle System

The vehicle system 10 is a system mounted in a vehicle. The vehicle is, for example, a two-wheeled, three-wheeled, or four-wheeled vehicle or the like. The drive source of the vehicle is an internal-combustion engine such as a diesel engine or a gasoline engine, an electric motor, or a combination thereof.

The vehicle system 10 includes, for example, a camera 12, a vehicle sensor 14, a direction indicator 16, an operation detector 18, a communication device 20, and a vehicle-side controller 30. These devices or instruments, the controller, and the like are connected to each other through a multiplex communication line such as a controller area network (CAN) communication line, a serial communication line, a wireless communication network, or the like. The vehicle system 10 may include an electronic control unit (ECU) or the like that controls each unit of a vehicle, in addition to the above functional configuration. The configuration shown in FIG. 1 is merely an example, and portions of the configuration may be omitted, or still other configurations may be added thereto.

The camera 12 is a digital camera using a solid-state imaging element such as, for example, a charge coupled device (CCD) or a complementary metal oxide semiconductor (CMOS). One or a plurality of cameras 12 are installed at any points of a vehicle (hereinafter, called a host vehicle M) having the vehicle system 10 mounted therein. In a case where a forward image is captured, the camera 12 is installed on the upper portion of the front windshield, the rear surface of the rear-view mirror, or the like. The camera 12, for example, repeatedly captures an image of the periphery of the host vehicle M periodically. The camera 12 may be a stereo camera.

A camera that captures a rearward or sideward image may be installed on the vehicle in addition to the camera that captures the forward image. Further, a radar device, light detection and ranging (LIDAR), or an object recognition device may be mounted in the vehicle in addition to the cameras. The radar device radiates radio waves such as millimeter-waves to the periphery of the host vehicle, and detects radio waves (reflected waves) reflected from an object to detect at least the position (distance and orientation) of the object. The LIDAR irradiates the periphery of the host vehicle with light, measures scattered light according to the irradiation light, and detects a distance to an object on the basis of a time from light emission to light reception. The object recognition device recognizes the position, type, speed, or the like of an object by performing a sensor fusion process on detection results according to some or all of the camera 12, the radar device, and the LIDAR.

The vehicle sensor 14 includes a vehicle speed sensor that detects the speed of the host vehicle M, an acceleration sensor that detects acceleration, a yaw rate sensor that detects angular velocity around a vertical axis, an orientation sensor that detects the direction of the host vehicle M, or the like.

The direction indicator 16 starts to blink by a driver's operation of a predetermined operation unit, and stops a blink by performing an operation for a return to a state in which before the predetermined operation unit is operated. The direction indicator 16 stops a blink by performing a predetermined operation. The operation detector 18 detects an operation which is performed on the direction indicator. For example, the operation detector 18 detects a state (on state) in which the direction indicator blinks or a state (off state) in which it does not blink, and outputs the detection result to the vehicle-side controller 30.

The communication device 20 communicates with the terminal device 50 using, for example, Bluetooth or the like. The communication device 20 may communicate with another vehicle which is present in the periphery of the host vehicle M using, for example, a cellular network, a Wi-Fi network, Bluetooth, dedicated short range communication (DSRC), or the like, or may communicate with various server devices through a wireless base station.

The vehicle-side controller 30 includes, for example, a data acquirer 32, an image analyzer 34, a lane recognizer 36, and information processor 38, and a data transmitter 40. The data acquirer 32 acquires an image captured by the camera 12, a detection result of the vehicle sensor 14, a detection result of the operation detector 18, or the like. The image analyzer 34 analyzes the image captured by the camera 12.

The lane recognizer 36 recognizes a traveling lane along which the host vehicle travels or an adjacent lane adjacent to the traveling lane on the basis of the analysis result of the image analyzer 34.

The information processor 38 recognizes a relative position of the host vehicle with respect to the traveling lane or a relative position of the host vehicle with respect to an adjacent lane on the basis of the recognition result of the lane recognizer 36.

Figure 2:
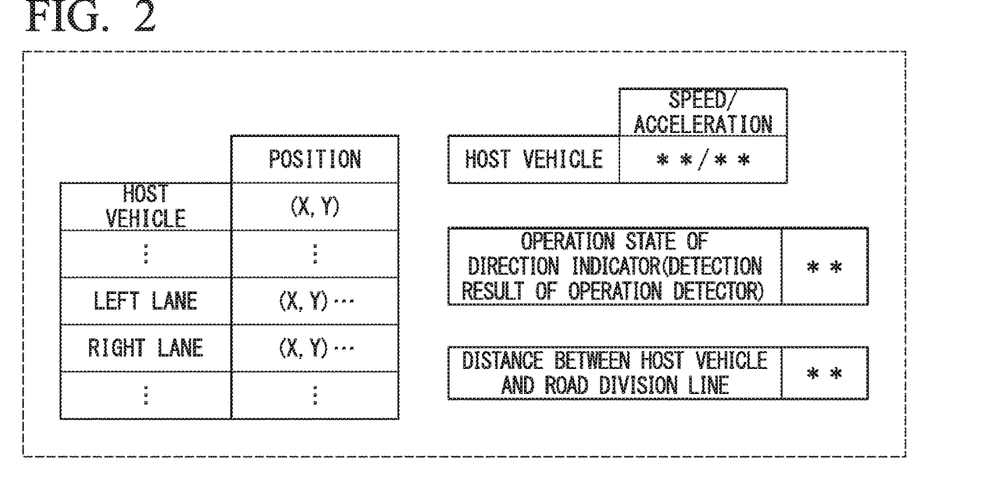
FIG. 2 is a diagram showing an example of content of information transmitted to a data transmitter.

The data transmitter 40 transmits information acquired by the data acquirer 32, the processing result of the information processor 38, or the like to the terminal device 50. FIG. 2 is a diagram showing an example of content of information transmitted to the data transmitter 40. Information transmitted from the vehicle system 10 to the terminal device 50 includes, for example, the position of the host vehicle M, the position of the traveling lane, the position of an adjacent lane, the speed of the host vehicle, the acceleration of the host vehicle, or the like. The information transmitted from the vehicle system 10 to the terminal device 50 includes, for example, a distance between the host vehicle M and a road division line, information indicating the presence or absence of a blink (operation performed on the blink) of the direction indicator detected by the operation detector 18, or the like.

Terminal Device

The terminal device 50 is a terminal device, such as, for example, a smartphone or a tablet terminal, which a crew member can carry. The terminal device 50 includes, for example, a communicator 52, a terminal-side controller 60, a storage 80, a touch panel 92, and a sound output unit 94. The storage 80 is realized by, for example, a read only memory (ROM), a flash memory, an SD card, a random access memory (RAM), a register, or the like. The storage 80 has, for example, a driving evaluation application 82, acquisition data 84, a setting map 86, and evaluation information 88 stored therein.

The driving evaluation application 82 is, for example, an application program which is provided by a server under the control of an automobile manufacturer, and is downloaded into the terminal device 50. The driving evaluation application 82 is an application program for evaluating a driver's driving. This application program is an application program for putting a high valuation on a case where a vehicle travels along the center of its lane. However, in a case where the direction indicator is operated, a process of a setting unit 68 described later is applied (see FIGS. 3 to 5 described later). In a case where the direction indicator is operated, this is because it is not appropriate to uniformly put a low valuation on a case where a vehicle does not travel along the center of its lane. The content of the acquisition data 84 and the evaluation information 88 will be described later.

The communicator 52 communicates with, for example, the vehicle system 10. The communication device 20 may communicate with various server devices through a wireless base station using, for example, a cellular network, a Wi-Fi network, Bluetooth, DSRC, or the like.

The terminal-side controller 60 is realized by the driving evaluation application 82 being executed using a processor such as the central processing unit (CPU) of the terminal device 50. The terminal-side controller 60 includes, for example, an acquirer 62, a separation processor 64, and an evaluator 66.

The acquirer 62 causes the storage 80 to store information transmitted by the vehicle system 10 as the acquisition data 84 (see FIG. 2 described above).

Figure 3:
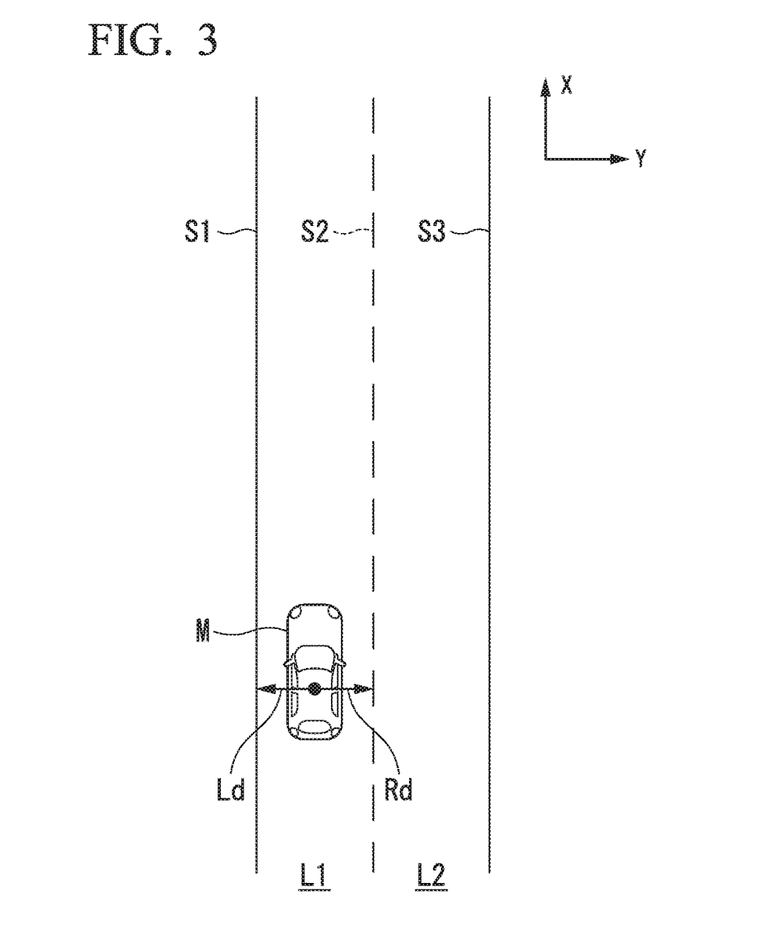
FIG. 3 is a diagram showing a process of a separation processor.

The separation processor 64 derives the position of the host vehicle in the traveling lane on the basis of information acquired by the acquirer 62. FIG. 3 is a diagram showing a process of the separation processor 64. In the following description, the traveling direction of a vehicle may be defined as an X direction, and the width direction of the vehicle may be defined as a Y direction. The separation processor 64 derives, for example, a distance Ld between a reference position of the host vehicle M traveling along a lane L1 at predetermined time intervals and a left road division line S1 and a distance Rd between the reference position of the host vehicle M traveling along a lane L1 at predetermined time intervals and a right road division line S2 (road division line dividing the lane L1 and a lane L2). The reference position, for example, is a predetermined position at the center of the host vehicle in a lateral direction.

The evaluator 66 evaluates a driver's skill in driving as higher as the host vehicle travels at a position closer to the center of the traveling lane on the basis of the processing result of the separation processor 64. The evaluator 66 repeats for example, a process of comparing the lengths of the distance Ld and the distance Rd derived by the separation processor 64 at the same timing, and puts a higher valuation on a driver with an increase in the number of times there is a small difference (no difference) between the distance Ld and the distance Rd. The evaluator 66 puts a lower valuation on a driver with an increase in the number of times of a large difference between the distance Ld and the distance Rd. The evaluator 66 causes the storage 80 to store a processing result for each predetermined interval as the evaluation information 86.

The evaluator 66 reduces the influence of the relative position of a vehicle with respect to its traveling lane along which the vehicle travels, acquired by the acquirer 62, on an evaluation during a first period from when the direction indicator 16 is operated to be in an on state by the operation detector 18, and gradually reduces the above influence during a second period shorter than the first period from when the direction indicator 16 is operated to be in an on state. The wording "reducing influence on an evaluation" means, for example, reducing a weight (for example, weight to be added or multiplied) used when the degree of separation from the center of a road is evaluated. The term "weight" is the degree of influence on an evaluation. The term "gradually" includes a gradual change, a gradational change, or a stepwise change. The details of the first period, the second period, and the following third period included in the first period will be described with reference to FIG. 4 described later. The wording "the center of a road" is not limited to the strict center of the lane of a road, and may be a region provided with an allowed width, or may be a position at which predetermined correction is performed on the center. The evaluator 66 may evaluate a driver's skill in driving as higher as the vehicle travels at a position closer to the reference position of its traveling lane instead of the center of the traveling lane.

After the direction indicator 16 is operated to be in an on state by the operation detector 18, the evaluator 66 is configured to gradually increase the influence of the relative position of a vehicle with respect to its traveling lane along which the vehicle travels, acquired by the acquirer 62, on an evaluation until a third period elapses from when the direction indicator 16 is operated to be in an off state. The wording "increasing influence on an evaluation" means, for example, increasing a weight used when the degree of separation is evaluated.

Figure 4:
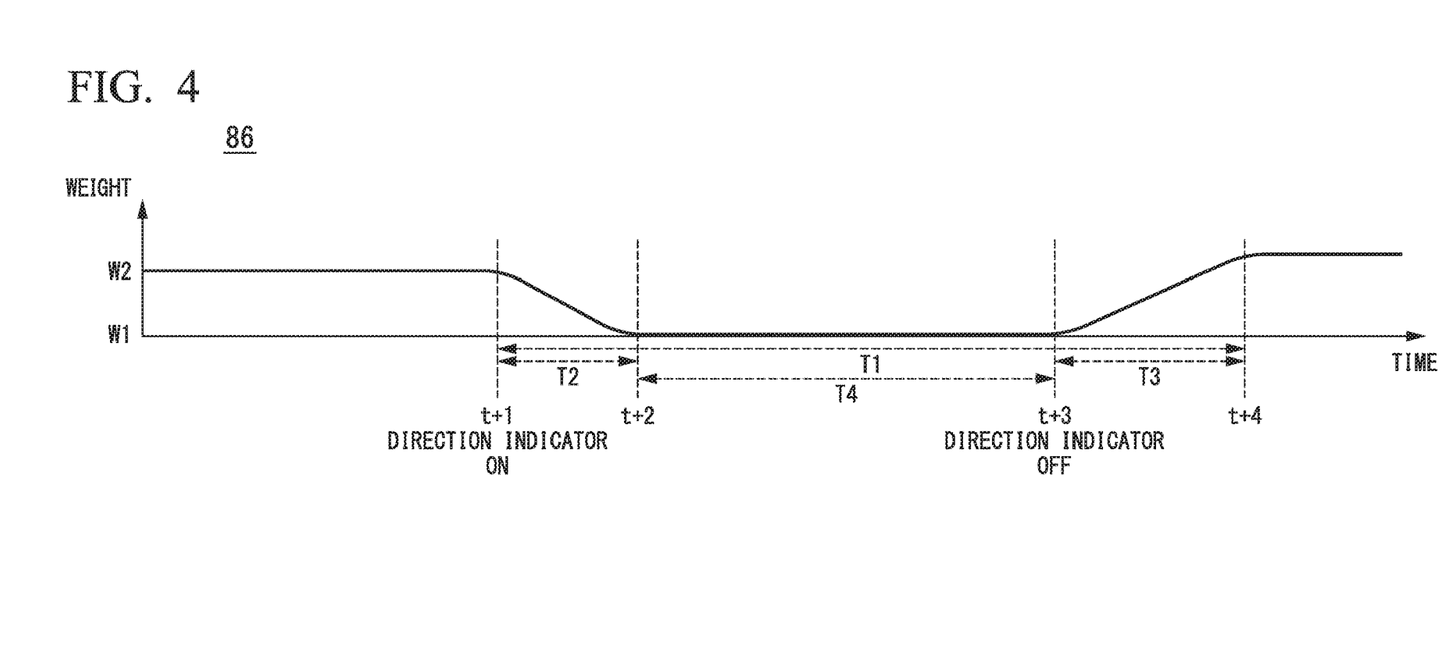
FIG. 4 is a diagram showing an example of content of a setting map.

The evaluator 66 includes the setting unit 68. The setting unit 68 refers to the setting map 86 during the first period or the second period, and reduces the influence of the relative position of a vehicle with respect to its traveling lane along which the vehicle travels on an evaluation. Specifically, the setting unit 68 reduces influence on an evaluation by adjusting a weight imparted to the above evaluation.

FIG. 4 is a diagram showing an example of content of the setting map 86. The vertical axis FIG. of 4 represents the magnitude of a weight imparted to an evaluation, and the horizontal axis represents a time. A first period T1 is a time from time t+1 to time t+4. Time t+1 is a time at which the direction indicator 16 is operated to be in an on state. Time t+2 is a time after a second period (for example, 3 seconds) has elapsed from time t+1. Time t+3 is a time at which the direction indicator 16 is operated to be in an off state after the elapse of time t+2. Time t+4 is a time after a third period T3 (for example, 6 seconds) has elapsed from time t+3. A period from time t+2 to time t+3 is called a fourth period T4.

In the fourth period T4, the weight is set to a first setting value W1 (for example, "0" or the lowest value). At times other than the first period T1, the weight is set to a second setting value W2 (for example, "1" or the highest value) higher than the first setting value W1.

In a second period T2, the weight is set to decrease while gradually changing from time t+1 toward time t+2. For example, at a timing close to time t+1, the weight tends to be set higher than at a timing close to time t+2.

In the third period T3, the weight is set to increase while gradually changing from time t+3 toward time t+4. For example, at a timing close to time t+4, the weight tends to be set higher than at a timing close to time t+3.

The third period T3 is a period longer than the second period T2. A degree (gradient) to which the weight increases in the third period T3 is gentler than a degree (gradient) to which the weight decreases in the second period T2. This is because a relationship between a timing at which the direction indicator 16 is operated to be in an off state and the position (end of a lane change) of the host vehicle M is smaller in the degree of influence on a surrounding vehicle than a relationship between a timing at which the direction indicator 16 is operated to be in an on state and the position (start of a lane change) of the host vehicle M.

The touch panel 92 is a device in which a display device and an operating unit that receives an input operation are combined. A score derived by the evaluator 66 is displayed on the touch panel 92.

The sound output unit 94 is, for example, a speaker that outputs a sound. The sound output unit 94 outputs a score derived by the evaluator 66 using a sound.

A process which is executed by the terminal-side controller 60 may be performed in real time, and may be performed after data acquired in real time is accumulated.

Situation 1

Figure 5:
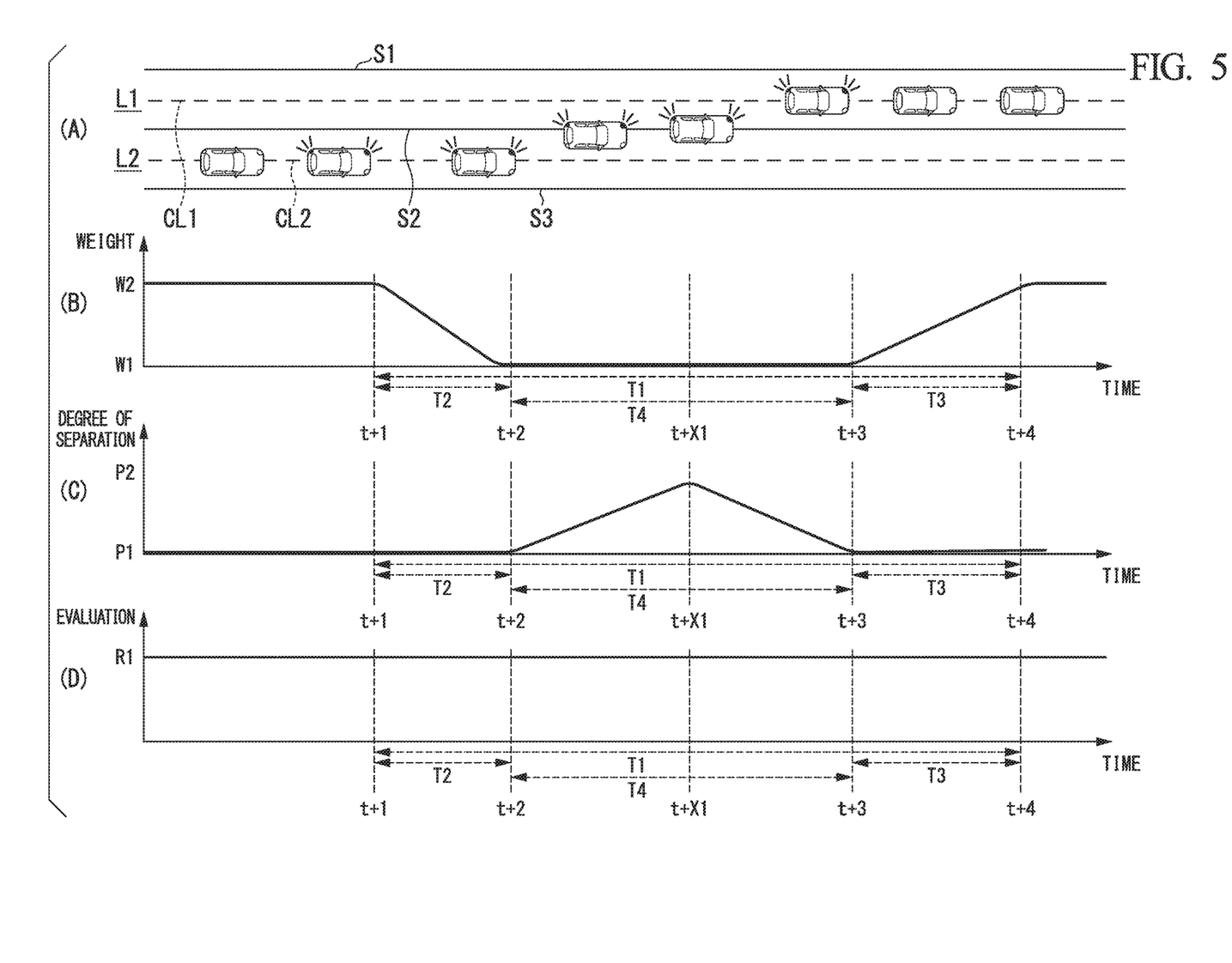
FIG. 5 is a diagram showing an example of a weight, the degree of separation, and the transition of evaluation in a situation 1 in which a host vehicle changes lanes.

FIG. 5 is a diagram showing an example of a weight, the degree of separation, and the transition of evaluation in a situation 1 in which the host vehicle M changes lanes. (A) of FIG. 5 shows behavior of the host vehicle M during a lane change, (B) of FIG. 5 shows content of the setting map 86, (C) of FIG. 5 shows the transition of the degree of separation, and (D) of FIG. 5 shows the transition of evaluation. The vertical axes of (B) of FIG. 5, (C) of FIG. 5, and (D) of FIG. 5 show a weight, the degree of separation, and evaluation, and the horizontal axes of (B) of FIG. 5, (C) of FIG. 5, and (D) of FIG. 5 show time. In an example described below, it is assumed that, in a case where the amount of operation of a steering wheel during high-speed driving or the like is set to be equal to or less than a predetermined degree, a blinker canceler does not operate in a lane change, and the direction indicator 16 is manually operated to be in an on state or an off state. However, the driving evaluation system 1 of the present embodiment can also be applied to the setting of a determination process or the like on the driving evaluation system 1 side even in a case where the direction indicator is operated by an automatic blinker canceler.

It is assumed that the direction indicator 16 is operated to be in an on state at time t+1, and that a lane change is started after the elapse of time t+2. The lane change may be started after the elapse of time t+2 in reality. The wording "a lane change is started" means that, for example, the reference position of the host vehicle M deviates from the center CL2 of the lane L2 where a lane change is started, and the degree of deviation generated is a predetermined degree or more. The degree of deviation may be the same as the degree of separation, or may be according to a separate reference. The wording "the degree of deviation generated is a predetermined degree or more" refers to, for example, a case where the host vehicle which is located in the vicinity of the center of the current traveling lane, maintained and driven starts to move to an extent of several cm toward to the adjacent lane by visual ascertainment.

It is assumed that, at time t+3, a lane change is finished, and the direction indicator 16 is operated to be in an off state after it is finished. The wording "a lane change is finished" means that the host vehicle M changes lanes from the lane L2 to the lane L1, and the reference position of the host vehicle M overlaps (or approaches the vicinity of) the center of the lane L1.

As shown in (B) of FIG. 5, the weight transitions as described above. As shown in (C) of FIG. 5, the degree of separation increases at a predetermined gradient from after time t+2 at which the host vehicle M starts a lane change toward time t+X1. Time t+X1 is a time in the fourth period T4, and is a time at which the host vehicle M reaches the vicinity of the road division line S2. The degree of separation at time t+X1 is an upper limit P2 of the degree of separation in the situation 1. As the host vehicle M comes close to the center CL1 of the lane L1 which is a lane change destination from time t+X1, the degree of separation transitions so as to decrease from the upper limit P2 to a lower limit P1.

In a case where the reference position (for example, the center in a width direction) of the host vehicle M exceeds the road division line S2, the separation processor 64 derives the degree of separation in the traveling lane L1. That is, in a case where the reference position of the host vehicle M exceeds the road division line S2, the separation processor 64 derives deviation between the center of the traveling lane L1 and the host vehicle M.

As shown in (D) of FIG. 5, an evaluation performed by the evaluator 66 is high, and constant (for example, evaluation R1). In the situation 1, this is because, up to time t+2 and at and after time t+3 for which the position of the host vehicle M has an influence on an evaluation, the host vehicle M travels along substantially the center of the lane of the traveling lane before a lane change or substantially the center of the traveling lane after a lane change. In the fourth period T4, the host vehicle M travels at a position deviating from the center of a lane due to a lane change, but this is because the weight in this time slot is low (for example, zero), and the position of the host vehicle M in this time slot is low in the degree of influence on an evaluation.

As described above, in a case where a timing at which the direction indicator 16 is operated and the behavior of a vehicle are preferable, driving is appropriately evaluated. As a result, it is possible to improve a driver's confidence in an evaluation result.

Situation 2

Figure 6:
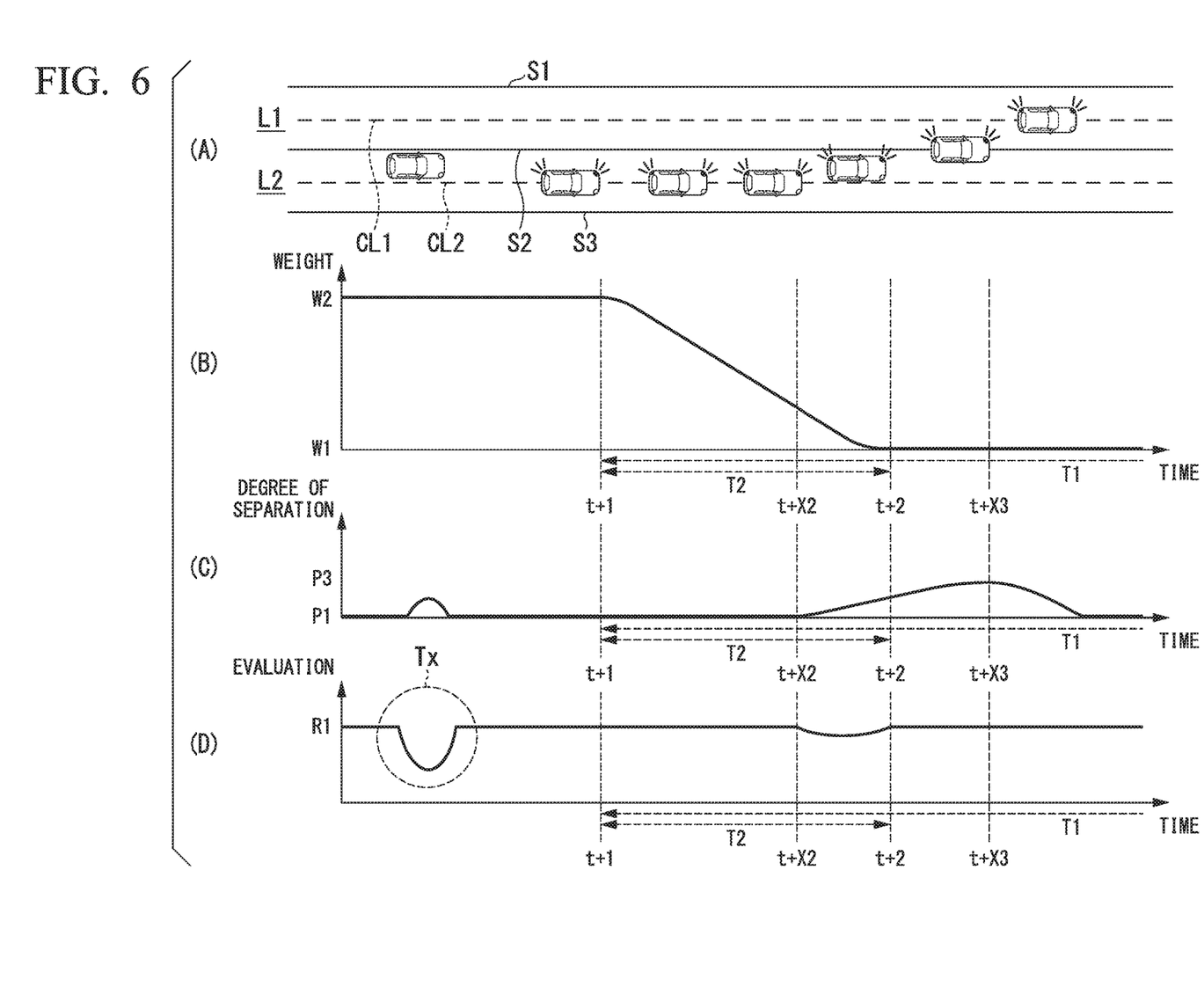
FIG. 6 is a diagram showing an example of a weight, the degree of separation, and the transition of evaluation in a situation 2 in which the host vehicle changes lanes.

FIG. 6 is a diagram showing an example of a weight, the degree of separation, and the transition of evaluation in a situation 2 in which the host vehicle M changes lanes. The same parts as those in FIG. 5 will not be described. FIG. 6 is a diagram shown with a focus on the second period T2.

It is assumed that the direction indicator 16 is operated to be in an on state at time t+1, and a lane change is started at time t+X2 before the elapse of time t+2. As shown in (C) of FIG. 6, the degree of separation increases from time t+X2 toward time t+X3. Time t+X3 is a time after the elapse of the second period T2, and is a time at which the host vehicle M has already crossed (is straddling) the road division line S2. The degree of separation at time t+X3 is an upper limit P3 in the situation 2. As the host vehicle M comes close to the center of the lane L1 which is a lane change destination from time t+X3, the degree of separation transitions so as to decline from the upper limit P3. Time t+X3 may be a time at which the host vehicle reaches the road division line S2 in reality.

As shown in (D) of FIG. 6, an evaluation performed by the evaluator 66 is set to be constant for a time from time t+1 to time t+X2 and for a time at and after time t+2. This is because the host vehicle M travels along the center CL2 of the lane L2 for a time from time t+1 to time t+X2, the weight on an evaluation is low (for example, zero) at and after time t+2, and the position of the host vehicle M in this time slot is low in the degree of influence on an evaluation.

For a time from time t+X2 to time t+2, a result obtained by imparting a weight to the degree of separation is derived as an evaluation. As shown in (C) of FIG. 6, the degree of separation increases from time t+X2 toward time t+2, but the weight imparted to the degree of separation also decreases from time t+X2 toward time t+2. Therefore, an evaluation of the degree of separation for a time from time t+X2 to time t+2 falls below the evaluation R1. For example, an evaluation of the degree of separation for the time from t+X2 to time t+2 becomes higher than an evaluation (see, for example, Tx in (D) of FIG. 6) in a case where separation is performed to the same degree immediately after the direction indicator 16 is operated to be in an on state or before the direction indicator 16 is operated to be in an on state.

As described above, even in a case where a timing at which the direction indicator 16 is operated when a lane change is started and a timing at which a lane change is started are not ideal, it is possible to appropriately evaluate driving. As a result, it is possible to improve a driver's confidence in an evaluation result.

For example, in the second period T2, a case where the weight is set to the second setting value W2 is considered. In this case, in a case where a lane change is started immediately before the second period T2 elapses, the same weight as that in a case where a lane change is started immediately after the direction indicator 16 has been operated is imparted, and an evaluation is influenced by the imparted weight. As a result, confidence in an evaluation of a driver who starts a lane change immediately before the second period T2 elapses may be low.

On the other hand, the driving evaluation system 1 of the present embodiment gradually decreases the weight in the second period T2. Thereby, an evaluation in a case where a lane change is started immediately before the second period T2 elapses becomes higher than an evaluation in a case where a lane change is started immediately after the operation of the direction indicator 16. As a result, a driver's confidence in an evaluation becomes higher.

Situation 3

Figure 7:
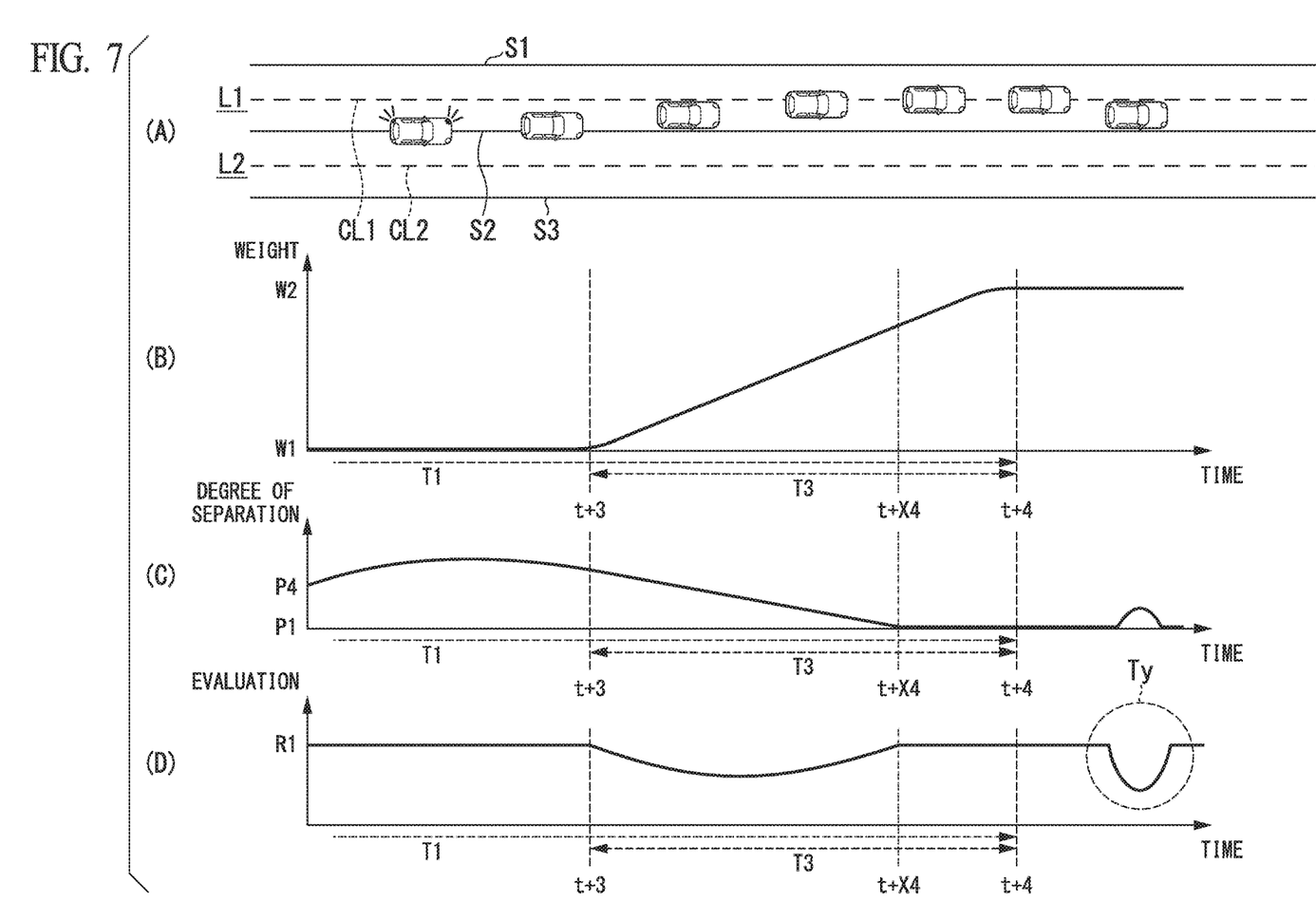
FIG. 7 is a diagram showing an example of a weight, the degree of separation, and the transition of evaluation in a situation 3 in which the host vehicle changes lanes.

FIG. 7 is a diagram showing an example of a weight, the degree of separation, and the transition of evaluation in a situation 3 in which the host vehicle M changes lanes. The same parts as those in FIG. 5 will not be described. FIG. 7 is a diagram shown with a focus on the third period T3.

It is assumed that, at time t+3, the direction indicator 16 is operated from an on state to an off state. In this case, the host vehicle M is present at a position straddling the road division line S2. As shown in (C) of FIG. 7, the degree of separation increases to an upper limit P4 a predetermined time before time t+3, and decreases from a predetermined time before time t+3 toward time t+X4. Time t+X4 is a time at which the host vehicle M is located at the center of the lane L1 which is a lane change destination. The degree of separation at time t+X4 is a lower limit P1 in the situation 3.

As shown in (D) of FIG. 7, an evaluation performed by the evaluator 66 is set to be constant for a time up to time t+3 and for a time from time t+X4 to time t+4. This is because, for a time up to time t+3, the direction indicator 16 of the host vehicle M is operated to be in an on state, the weight on an evaluation is low (for example, zero), and the position of the host vehicle M in this time slot is low in the degree of influence on an evaluation. This is because the host vehicle M travels along the center of the lane L1 for a time from time t+X4 to time t+4.

For a time from time t+3 to time t+X4, a result obtained by imparting a weight to the degree of separation is derived as an evaluation. As shown in (C) of FIG. 7, the degree of separation decreases from time t+3 toward time t+X4, but the weight imparted to the degree of separation increases from time t+3 toward time t+X4 and from the first setting value W1 toward the second setting value W2. Therefore, an evaluation of separation for the time from time t+3 to time t+X4 becomes higher than, for example, an evaluation (see, for example, Ty in (D) of FIG. 7) in a case where separation is performed to the same degree immediately before time t+4 or at and after time t+4.

As described above, even in a case where a timing at which the direction indicator 16 when a lane change is finished is operated and a timing at which a lane change is finished are not ideal, it is possible to appropriately evaluate driving. As a result, it is possible to improve a driver's confidence in an evaluation result.

For example, in the third period T3, a case where the weight is set to the second setting value W2 is considered. In this case, in a case where the degree of separation is high in the initial stage of the third period T3, the same weight as that in a case where the degree of separation is high in the end stage of the third period T3 is imparted, and an evaluation is influenced by the imparted the weight. As a result, a driver's confidence in an evaluation in which the degree of separation is high in the initial stage of the third period T3 (the direction indicator 16 is controlled to be in an off state immediately before a lane change is finished) may be low.

On the other hand, the driving evaluation system 1 of the present embodiment gradually increases a weight in the third period T3. Thereby, an evaluation in a case where a lane change is finished in the initial stage of the third period T3 becomes higher than an evaluation in a case where a lane change is finished in end stage of the third period T3. As a result, a driver's confidence in an evaluation becomes higher.

Here, in a comparative example, an evaluation result is output on the basis of a time difference between a direction indicator operation start time (t00) and a lane change start time (t01). Specifically, in a case where an evaluation target value (t00-t01) is appropriate for a reference value, it is regarded as safe. In the above comparative example, an evaluation of driving in which the center of the lane is maintained is not considered. For example, in a case where the separation of a vehicle from the center of its lane in order to make a lane change, a system may put a low valuation on the driving uniformly, a driver may not be able to gently convince an evaluation result. Consequently, the driving evaluation system 1 of the present embodiment is configured to include an evaluator that evaluates driving in which the center of a lane is maintained, the evaluator gradually reducing the influence of the relative position of a vehicle on an evaluation during a predetermined period from when the direction indicator is operated to be in an on state. Therefore, in case where a driver improves association between a direction indicator operation and a lane change operation even a little bit, the improvement is reflected on an evaluation. Thereby, it is possible to improve a driver's confidence in an evaluation result.

Flow Chart

Figure 8:
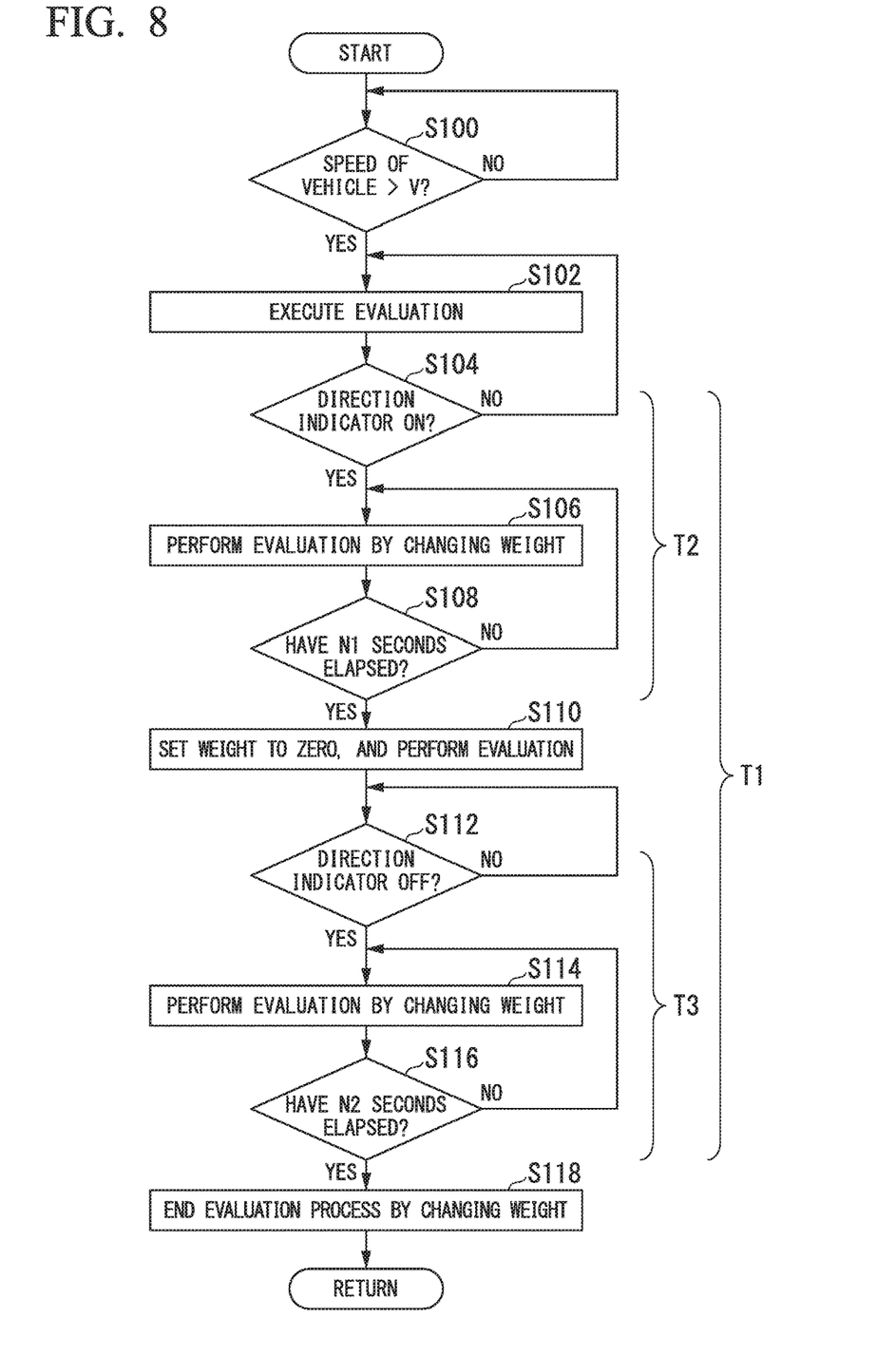
FIG. 8 is a flow chart showing an example of a flow of processes executed by a terminal-side controller.

FIG. 8 is a flow chart showing an example of a flow of processes executed by the terminal-side controller 60. First, the acquirer 62 determines whether the speed of a vehicle exceeds speed V1 (for example, 20 km) (step S100). In a case where the speed of the vehicle exceeds the speed V1, the terminal-side controller 60 executes an evaluation (step S102). The wording "executing an evaluation" means that the acquirer 62, the separation processor 64, and the evaluator 66 execute processes. In this case, the setting unit 68 of the evaluator 66 sets a weight to the second setting value W2.

Next, the acquirer 62 determines whether the direction indicator 16 is in an on state (step S104). In a case where the direction indicator 16 is not in an on state, the flow returns to the process of step S102. In a case where the direction indicator 16 is in an on state, the evaluator 66 evaluates driving by changing a weight to the degree of separation (step S106).

Next, the evaluator 66 determines whether the direction indicator 16 is operated to be in an on state and then N1 seconds (for example, 3 seconds) has elapsed (step S108). In a case where the direction indicator 16 is operated to be in an on state and then N1 seconds have not elapsed, the flow returns to the process of step S106.

In a case where the direction indicator 16 is operated to be in an on state and then N1 seconds have elapsed, the evaluator 66 sets the weight to the first setting value W1 (for example, zero), and evaluates driving (step S110). In a case where N1 seconds have elapsed, a time which is taken until the direction indicator 16 is operated to be in an off state may be set not to be evaluated. A time which is taken until the direction indicator 16 is operated to be in an on state and then N1 seconds have elapsed is an example of the second period T2.

Next, the acquirer 62 determines whether the direction indicator 16 is in an off state (step S112). In a case where the direction indicator 16 is in an off state, the evaluator 66 evaluates driving by changing the weight to the degree of separation (step S114).

Next, the evaluator 66 determines whether the direction indicator 16 is operated to be in an off state and then N2 seconds (for example, 6 seconds) have elapsed (step S116). In a case where the direction indicator 16 is operated to be in an off state and then N2 seconds have not elapsed, the flow returns to the process of step S114. In a case where the direction indicator 16 is operated to be in an on state and then N2 seconds have elapsed, the evaluator 66 ends the evaluation by changing the weight (step S118). That is, the weight is set to the second setting value W2. A time which is taken until the direction indicator 16 is operated to be in an off state and then N2 seconds have elapsed is an example of the third period T3. Thereby, processes of one routine of this flow chart are ended.

As described above, the terminal-side controller 60 can appropriately evaluate driving by imparting a weight to the degree of separation in accordance with the control state of the direction indicator 16. As a result, it is possible to improve a driver's confidence in an evaluation result.

In the above process, in a case where a timing at which the direction indicator 16 is operated and a timing at which a vehicle starts or ends a lane change are preferable or ideal, information for commending a driver for his or her driving (for example, information such as the wording "You could make a lane change appropriately") may be output by the output unit (the touch panel 92 or the sound output unit 94). In a case where deviation is present between a timing at which the direction indicator 16 is operated and a timing at which a vehicle starts or ends a lane change, the evaluator 66 may output advice for correcting the deviation to the output unit. This advice is, for example, "On making a lane change, blink the direction indicator 16 a little more early" or the like.

Modification Example 1

Figure 9A:
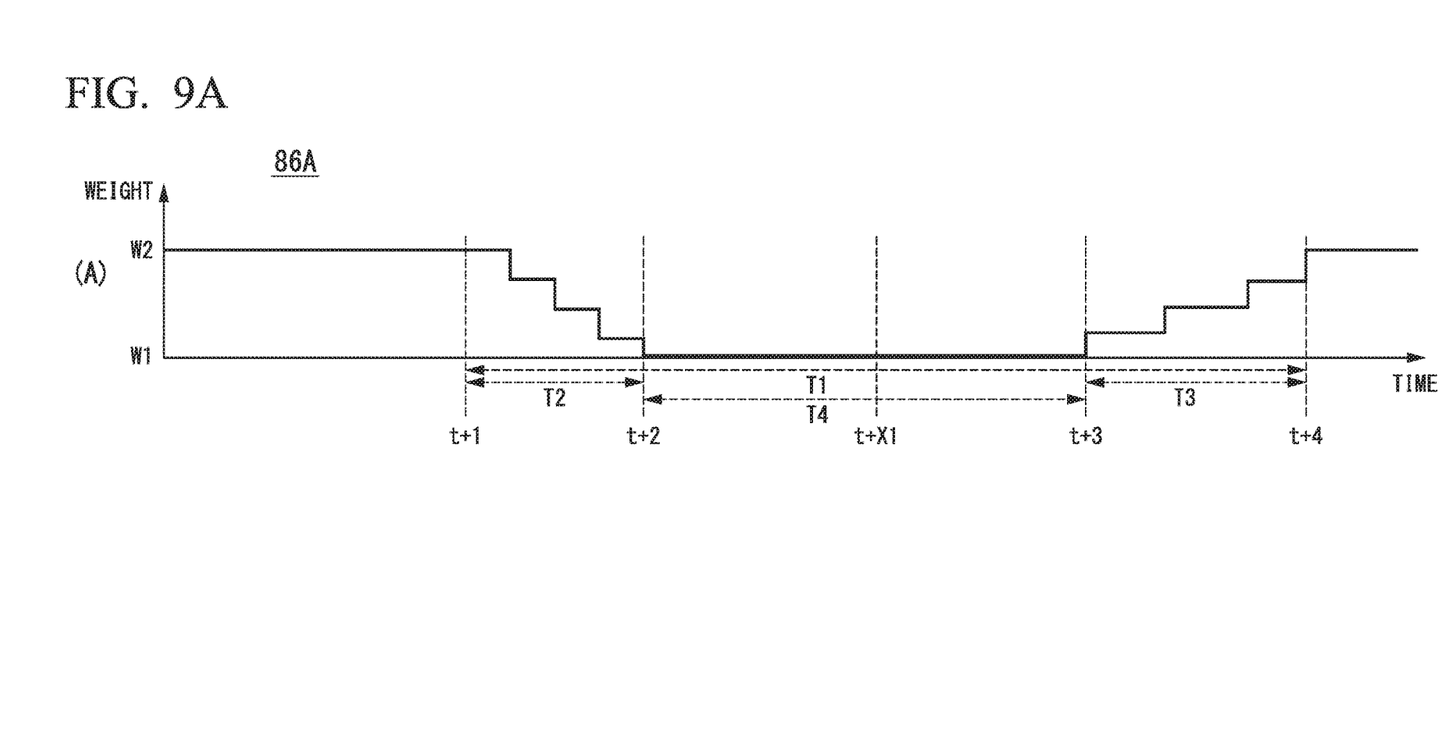
FIG. 9A is a diagram showing an example of content of the setting map of a modification example.

In the above-described process, a gradual decrease has occurred from the second setting value W2 toward the first setting value W1 in the first period T1, but there is no limitation thereto. FIG. 9A is a diagram showing an example of content of a setting map 86A of a modification example. The same parts as those in FIG. 4 will not be described.

FIG. 9A shows content of the setting map 86A. In the second period T2, the weight decreases in a stepwise manner from the second setting value W2 with the elapse of time, and reaches the first setting value W1. In the third period T3, the weight increases in a stepwise manner from the first setting value W1 with the elapse of time, and reaches the second setting value W2.

Figure 9B:
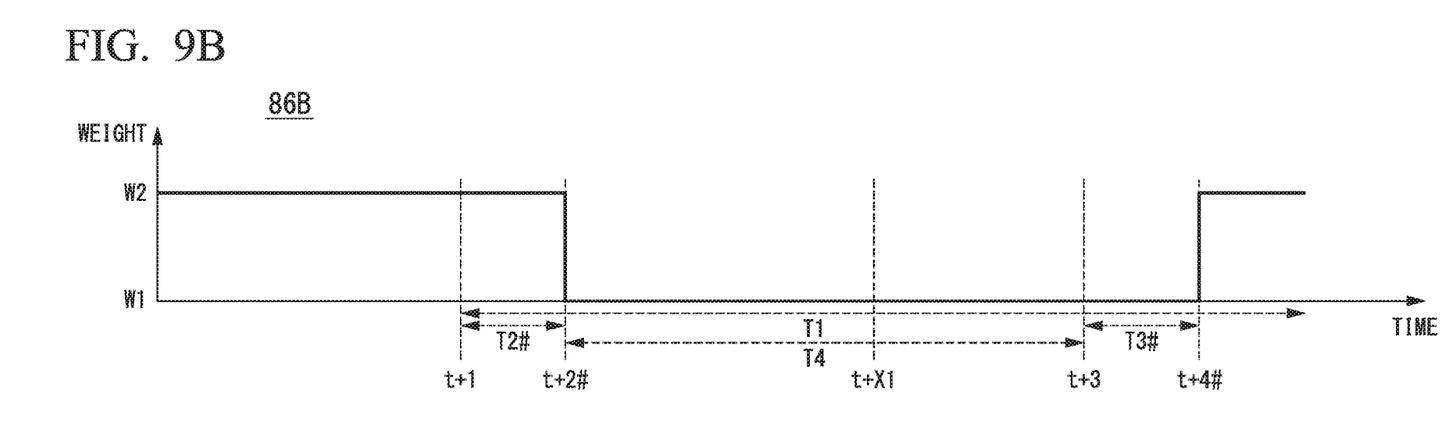
FIG. 9B is a diagram showing an example of content of the setting map of a modification example.

FIG. 9B is a diagram showing an example of content of a setting map 86B. In a second period T2#, the weight is set to the second setting value W2, and is set to the second setting value W2 at time t+2#. The second period T2# is period from time t+1 to time t+2#. In a third period T3#, the weight is set to the first setting value W1, and is set to the second setting value W2 at time t+4#. The second period T3# is period from time t+3 to time t+4#.

Modification Example 2

In the above-described embodiment, a description has been given in which the terminal-side controller 60 is realized by the driving evaluation application 82 being executed, but there is no limitation thereto. For example, some of the functional units of the terminal-side controller 60 may be realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by cooperation between software and hardware.

Some or all of instruments or functional units included in the terminal device 50 may be included in the vehicle system 10. On the contrary, some or all of instruments or functional units included in the vehicle system 10 may be included in the terminal device 50 as shown in FIG. 10.

Figure 10:
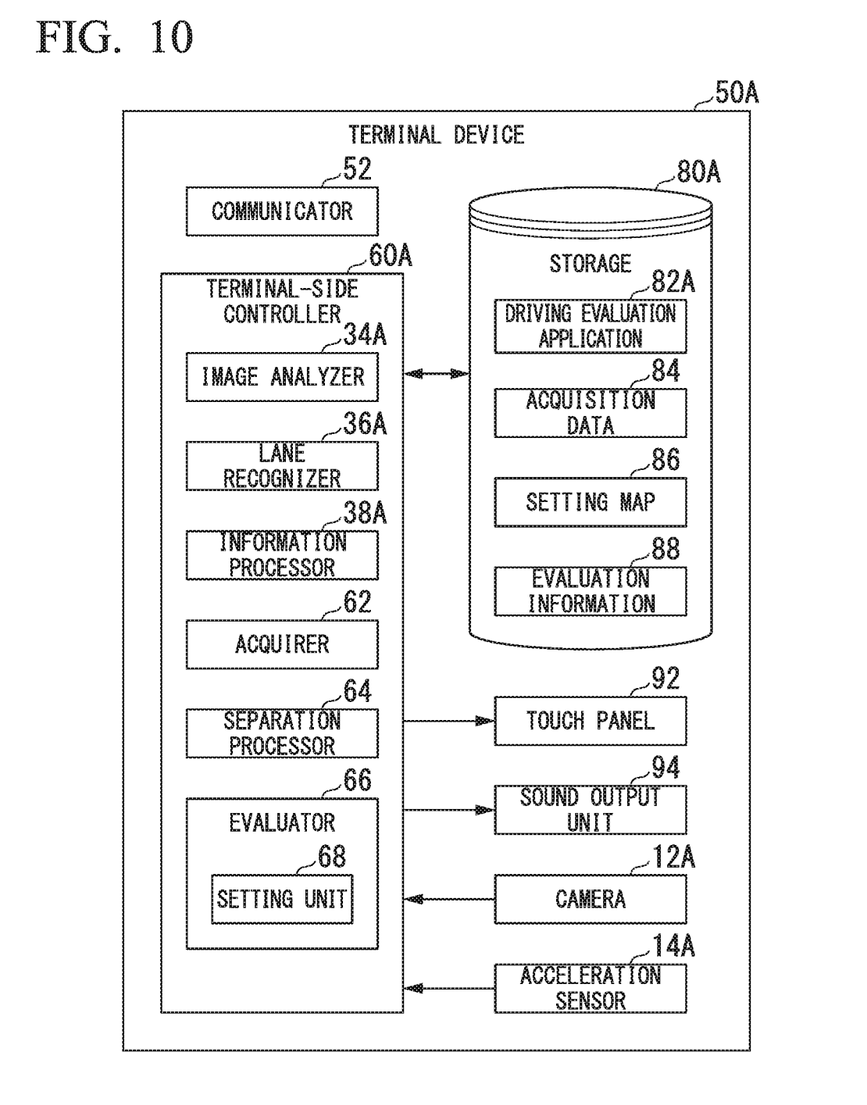
FIG. 10 is a diagram showing an example of a functional configuration of a terminal device.

FIG. 10 is a diagram showing an example of a functional configuration of a terminal device 50A. The terminal device 50A includes, for example, a camera 12A and an acceleration sensor 14A in addition to the functional configuration of the terminal device 50. The camera 12A has the same function as that of the camera 12. The acceleration sensor 14A derives acceleration.

The terminal device 50A includes a terminal-side controller 60A instead of the terminal-side controller 60. The terminal-side controller 60A includes an image analyzer 34A, a lane recognizer 36A, and an information processor 38A in addition to the functional configuration of the terminal-side controller 60. The image analyzer 34A, the lane recognizer 36A, and the information processor 38A have the same functions as those of the image analyzer 34, the lane recognizer 36, and the information processor 38, respectively. The information processor 38A derives a speed on the basis of the detection result of the acceleration sensor 14A.

The terminal device 50A includes a storage 80A instead of the storage 80. A driving evaluation application 82A is stored in the storage 80A instead of the driving evaluation application 82. The terminal-side controller 60A is realized by the driving evaluation application 82A being executed using a processor such as the CPU of the terminal device 50. The image analyzer 34A, the lane recognizer 36A, and the information processor 38A are realized by the driving evaluation application 82A being executed by a processor.

The terminal device 50A is fixed to, for example, a stand or the like provided on the upper surface of the instrument panel of a vehicle. Specifically, the terminal device 50A is installed at a position at which the front of the vehicle can be imaged by the camera 12A in a state where the driving evaluation application 82A is executed. The terminal device 50A executes an evaluation process on the basis of an image captured by the camera 12A.

The driving evaluation system 1 of the present embodiment can also be applied to a case where a lane change is performed by automatic driving. In this case, a user can know a trend in the behavior of a vehicle in automatic driving.

According to the embodiment described above, it is possible to improve a driver's confidence in an evaluation result by including the acquirer 62 that acquires the operation state of the direction indicator 16 and the relative position of a vehicle with respect to a traveling lane along which the vehicle travels, and the evaluator 66 that refers to the relative position acquired by acquirer 62 and thereby evaluate a driver's skill in driving as higher as the vehicle travels at a position closer to the center of the traveling lane, the evaluator 66 reducing the influence of the relative position of the vehicle acquired by the acquirer 62 on an evaluation during a first period from when the direction indicator 16 is operated to be in an on state on the basis of the operation state of the direction indicator 16 acquired by the acquirer 62, and gradually reducing the influence during a second period shorter than the first period from when the direction indicator 16 is operated to be in an on state on the basis of the operation state of the direction indicator 16 acquired by the acquirer 62.

Hardware Configuration

Figure 11:
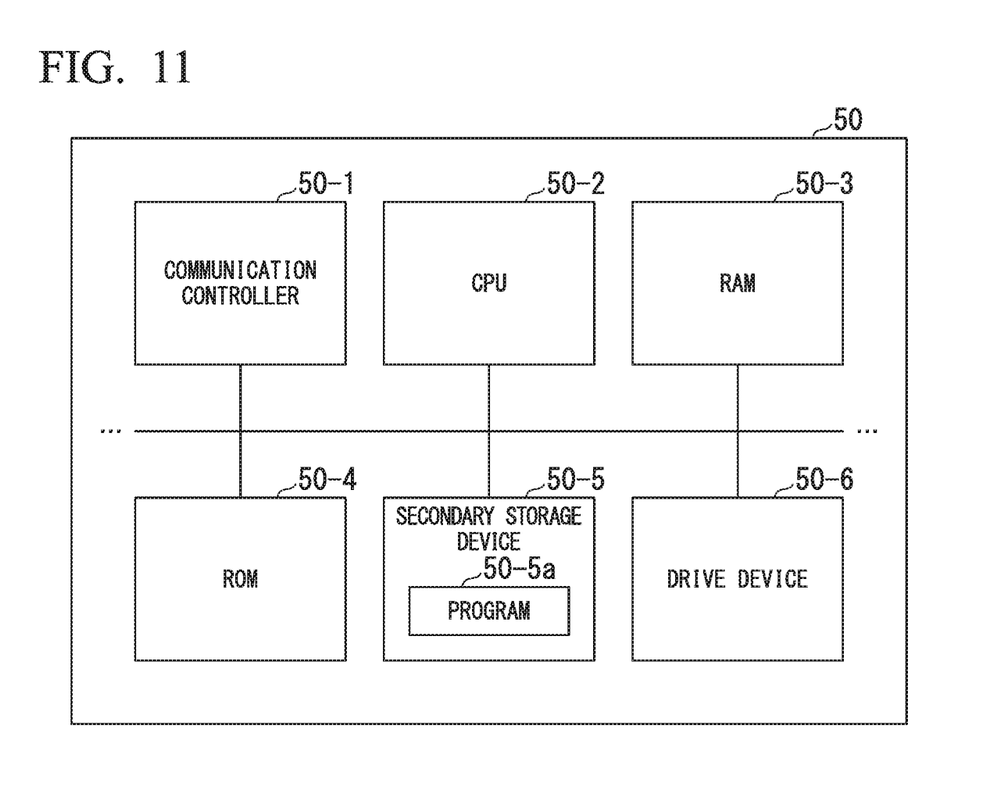
FIG. 11 is a diagram showing an example of a hardware configuration of a terminal device of an embodiment.

The terminal device 50 of the above-described embodiment is realized by, for example, the hardware configuration as shown in FIG. 11. FIG. 11 is a diagram showing an example of a hardware configuration of the terminal device 50 of an embodiment.

The terminal device 50 is configured such that a communication controller 50-1, a CPU 50-2, a RAM 50-3, a ROM 50-4, a secondary storage device 50-5 such as a flash memory or an HDD, and a drive device 50-6 are connected to each other through an internal bus or a dedicated communication line. The drive device 50-6 has a portable storage medium such as an optical disc mounted thereon. A program 50-5a stored in the secondary storage device 50-5 is developed into the RAM 50-3 by a DMA controller (not shown) or the like and is executed by the CPU 50-2, whereby the terminal-side controller 60 is realized. The program (for example, the driving evaluation application 82) which is referred to by the CPU 50-2 may be stored in a portable storage medium mounted in the drive device 50-6, and may be downloaded from other devices through a network.

The above embodiment can be represented as follows.

A driving evaluation system including:
a storage device; and
a hardware processor configured to execute a program stored in the storage device,
wherein the hardware processor executes the program to
acquire an operation state of a direction indicator and a relative position of a vehicle with respect to a traveling lane along which the vehicle travels, refer to the acquired relative position and thereby evaluate a driver's skill in driving as higher as the vehicle travels at a position closer to the center of the traveling lane, reduce an influence of the acquired relative position of the vehicle on an evaluation during a first period from when the direction indicator is operated to be in an on state on the basis of the acquired operation state of the direction indicator, and gradually reduce the influence during a second period shorter than the first period from when the direction indicator is operated to be in an on state on the basis of the operation state of the direction indicator acquired by the acquirer.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving evaluation system comprising:
an acquirer configured to acquire an operation state of a direction indicator and a relative position of a vehicle with respect to a traveling lane along which the vehicle travels; and
an evaluator configured to refer to the relative position acquired by the acquirer and thereby evaluate a driver's skill in driving as higher as the vehicle travels at a position closer to the center of the traveling lane, the evaluator reducing an influence of the relative position of the vehicle acquired by the acquirer on an evaluation during a first period from when the direction indicator is operated to be in an on state on the basis of the operation state of the direction indicator acquired by the acquirer, and gradually reducing the influence during a second period shorter than the first period from when the direction indicator is operated to be in an on state on the basis of the operation state of the direction indicator acquired by the acquirer.

2. The driving evaluation system according to claim 1, wherein the first period includes a period until an elapse of a third period shorter than the first period from when the direction indicator is operated to be in an off state.

3. The driving evaluation system according to claim 1, wherein the evaluator is configured to gradually increase the influence until a third period elapses from when the direction indicator is operated to be in an off state.

4. The driving evaluation system according to claim 3, wherein the second period is shorter than the third period.

5. The driving evaluation system according to claim 1, wherein, in a process of reducing an influence of a relative position of a vehicle acquired by the acquirer on an evaluation during the second period, the evaluator is configured to change the influence of the relative position of the vehicle acquired by the acquirer on an evaluation stepwise from a high state to a low state, or gradually change the influence from a high state to a low state.

6. The driving evaluation system according to claim 3, wherein, in a process of reducing an influence of the relative position of the vehicle acquired by the acquirer on an evaluation during a third period, the evaluator is configured to change the influence of the relative position of the vehicle acquired by the acquirer on an evaluation stepwise from a low state to a high state, or gradually change the influence from a low state to a high state.

7. A non-transitory computer-readable storage medium configured to cause a computer to:
   acquire an operation state of a direction indicator and a relative position of a vehicle with respect to a traveling lane along which the vehicle travels;
   refer to the acquired relative position and thereby evaluate a driver's skill in driving as higher as the vehicle travels at a position closer to the center of the traveling lane;
   reduce an influence of the acquired relative position of the vehicle on an evaluation during a first period from when the direction indicator is operated to be in an on state on the basis of the acquired operation state of the direction indicator, and
   gradually reduce the influence during a second period shorter than the first period from when the direction indicator is operated to be in an on state on the basis of the operation state of the direction indicator acquired by the acquirer.

\* \* \* \* \*